United States Patent [19]
Wheable

[11] 4,054,385
[45] Oct. 18, 1977

[54] APPARATUS FOR DETERMINING THE POSITION OF A SPOT OF LIGHT ON A PLANE SURFACE

[75] Inventor: Desmond Wheable, Overton, England

[73] Assignee: Bell & Howell Limited, Basingstoke, England

[21] Appl. No.: 716,764

[22] Filed: Aug. 23, 1976

[30] Foreign Application Priority Data

Aug. 27, 1975 United Kingdom ............... 35439/75

[51] Int. Cl.$^2$ ............................................. G01B 11/00
[52] U.S. Cl. ................................... 356/138; 250/237 R; 350/160 LC; 356/156; 356/170; 356/172
[58] Field of Search ............... 356/138, 156, 170, 172; 350/266, 276; 250/237 R, 237 G

[56] References Cited

U.S. PATENT DOCUMENTS

| | | | |
|---|---|---|---|
| 3,649,122 | 3/1972 | Holtz | 356/172 |
| 3,800,148 | 3/1974 | DeCock | 250/562 |
| 3,894,230 | 7/1975 | Rorden et al. | 356/172 |

*Primary Examiner*—John K. Corbin
*Assistant Examiner*—R. A. Rosenberger

*Attorney, Agent, or Firm*—Richard L. Myers

[57] ABSTRACT

Apparatus for determining the position on a plane surface where a beam of light strikes the surface in relation to a datum position. In one embodiment the apparatus comprises a liquid crystal device having a common, transparent electrode on one surface and a plurality of spaced, parallel, segmental, transparent electrodes on the other surface to define a corresponding plurality of liquid crystal cells. Means is provided for changing the light-transmission characteristics of the liquid-crystal cells in a predetermined sequence from a datum position. Means is provided for directing a beam of light towards the liquid-crystal device from one side of the device and a detector positioned on the other side of the device is arranged to detect a change in the light-level of the beam transmitted through the liquid-crystal device when the light-transmitting characteristic of a cell receiving the beam is changed to provide a detector output signal and an indicator responsive to the detector output signal provides an indication of the cell receiving the beam, thereby providing an indication of the position on the surface of the liquid-crystal device struck by the beam.

39 Claims, 9 Drawing Figures

APPARATUS FOR DETERMINING THE POSITION OF A SPOT OF LIGHT ON A PLANE SURFACE

BACKGROUND OF THE INVENTION

This invention relates to apparatus for determining the position of a spot of light on a substantially plane surface or the position on such a surface where a beam of light strikes the surface.

DISCUSSION OF THE PRIOR ART

It is often necessary accurately to determine the position of a spot of light in relation to a datum position, for example to determine the angular or linear deflection of a reflecting surface from a datum position using a source of a beam of light directed on the light-reflecting surface.

It is an object of the invention to provide such apparatus suitable for this purpose embodying an electrooptic device such as a liquid crystal device. Liquid crystals are substances which behave, within a given temperature range, like fluids in a rheological sense and like crystals in an optical sense. Stated simply a liquid crystal is in a state, called "mesophase", intermediate the liquid and solid states. Three such mesophase states are known of which one, the nematic mesophase appears to have most practical applications. A liquid crystal has the property that its light-transmission characteristics change when an electric field is applied across it. One type of liquid crystal changes from transparent to opaque in the presence of an electric field while another type changes from opaque to transparent. For ease of explanation in this specification the former type only will be considered but it will be realized that the latter type could also be used with the necessary, simple modifications to the apparatus. A typical liquid-crystal device comprises a quantity of the substance sandwiched between two suitably spaced, parallel glass plates on the inner surfaces of which are formed transparent electrodes, generally of a tin-oxide. If a d.c. or low frequency a.c. electric field is applied between the electrodes the device changes from transparent to opaque. Thus a beam of light so directed that it passes through such a device could be interrupted by the application of an electric field between the electrodes.

SUMMARY OF THE INVENTION

According to the invention there is provided apparatus for determining the position on a substantially plane surface where a beam of light strikes the surface in relation to a datum position, comprising an electrooptic device, such as a liquid crystal device, having a common electrode on one surface and a plurality of spaced, segmental, electrodes in a predetermined pattern on the other surface to define a corresponding plurality of electrooptic cells of which at least the common electrode or the plurality of segmental electrodes is transparent, means for changing the light-transmission characteristics of the electrooptic cells in a predetermined sequence from a datum position, means for directing a beam of light towards the electrooptic device and detector means positioned in relation to the device and the light-directing means for detecting a change in the light-level of the beam transmitted through the electrooptic device when the light-transmitting characteristic of a cell receiving the beam is changed to provide a detector output signal and means responsive to the detector output signal for providing an indication of the cell receiving the beam, thereby to provide an indication of the position on the surface of the electrooptic device struck by the beam.

If both the common electrode and the plurality of segmental electrodes are transparent the source is positioned on one side of the electrooptic device and the detector means on the other.

If only one of the common electrode or plurality of segmental electrodes is transparent, the source and the detector means are positioned on the side of the electrooptic device having the transparent electrode or electrodes and the electrode, or electrodes, on the other surface of the device is made reflective.

The means for changing the light-transmission characteristics of the cells may comprise means for energising the segmental electrodes in a predetermined sequence.

The means for energising the segmental electrodes may comprise a shift register, or a counter and decoder arranged to operate in a similar manner to a shift register, having its output connected to the said electrodes.

The plurality of segmental electrodes may be in the form of a grid of parallel bars of substantially equal width or the width of the bars may be varied to compensate for differing beam light-path lengths as the beam traverses the length of the device.

The spacing between the bars may be substantially constant along the length of the device, or it may be varied to compensate for different beam light-path lengths as the beam traverses the length of the device depending upon the form of the means for directing the beam of light.

Apparatus comprising such a device may be used, for example, to determine the angular deflection or the linear deflection of the means for directing the beam of light depending upon the form of the said means.

The plurality of segmental electrodes may take other forms such as a plurality of bars extending radially outwardly from a common axis, or a plurality of spaced segments arranged in the form of an annulus.

The plurality of segmental electrodes may be arranged in $n$ groups each of $m$ segments having $n$ corresponding common electrodes.

The $n$ groups of segments of the electrooptic device of the immediately preceding paragraph may be arranged as $n/y$ groups of segments in each of $y$ parallel rows.

Each group of $m$ segments in a row is spaced from an adjacent group in the row by an amount equal to the length of said group multiplied by $(y - 1)$ and the groups in one row are staggered in relation to the groups in an adjacent row whereby the cells in a group in one row are energised sequentially, then the cells in the next succeeding group in an adjacent row and so on.

Corresponding segmental electrodes in each group may be coupled together and the means for energising the electrodes may comprise a source of a potential difference and means for coupling the source to the segmental electrodes and the common electrodes in such a manner that one side of th source is coupled sequentially to each of the first to $m$th segmental electrodes in common at a first rate and the other side of the source is coupled sequentially to each of the common electrodes starting with the first, at a second, slower rate such that the said other side of the source is switched from one common electrode to the next as the said one side is switched from the $m$th to the first segmental electrode.

The means for energising the electrodes according to the immediately preceding paragraph may further comprise means for first coupling the said one side of the source to all of the segmental electrodes simultaneously, means for coupling the said other side of the source to the common electrodes in a predetermined sequence until a first change in light-level is detected, means responsive to the first detected output signal for stepping-back one step in the predetermined sequence of common electrodes, and secondly for causing the means for energising the segmental electrodes to operate according to the immediately preceding paragraph.

Preferably, the width of the beam in cross-section is equal to the width of a segment. The length of the beam in cross-section should be sufficient to span all of the rows or a separate beam may be provided for each row and so arranged that they move along the rows together.

The indicator means for providing an indication of the cell receiving the beam may comprise a counter arranged to count the number of cells energised from a datum cell until the detector output signal is received. The indicator means may also comprise a decoder coupled to the counter for decoding the count therein, and digital indicating means coupled to the decoder for providing a visual indication of the count.

The indicator means may also include measuring means for measuring the magnitude of the detector output signal and for using the measured value with the count in the counter to increase the resolution of the said indication.

Preferably the measuring means includes an analog-to-digital converter.

DESCRIPTION OF THE DRAWINGS

The invention will now be described by way of example with reference to the accompanying drawings, in which.

As aforementioned, if a beam of light is so directed that it passes through a liquid crystal device it can be interrupted by applying an electric field across the device. If one of the electrodes of the device is divided into a plurality of segmental electrodes and an electric field can be applied selectively between any one of the segmental electrodes and the common electrode on the other surface of the device the device can be regarded as comprising a plurality of liquid-crystal cells. If the beam of light has a cross-sectional area small in relation to the superficial area of the device the position where it impinges on the device and forms a spot on the surface, or a notional spot when the liquid crystal is transparent, could be determined by applying the electric field across each of the cells in sequence until the light beam passing through the device is interrupted. The change in light-level, or the quantity of light transmitted, could be detected and used in some way to determine which cell was energised and hence the position of the spot. This is the basis of the present invention.

In order accurately to determine the position of the beam, the segmental electrodes could be deposited as narrow bars in the form of a fine grid and the light transmission characteristics of the cells defined by the bars of the grid changed one bar at a time. This could be achieved by having one large, common electrode on the other surface of the device behind the grid and bringing-out a separate wire from each bar. If each bar in sequence along the grid was connected to an appropriate output stage of a shift register arranged to receive shift pulses from a clock pulse generator, each bar could be activated in sequence as a bit is shifted sequentially from stage to stage along the shift register. A problem with such a device could be that a very long shift register may be required with a large number of interconnecting leads from the liquid-crystal device. If for instance a resolution of 0.1% is required then 1001 connections would have to be made to the liquid-crystal device. One way of alleviating this problem is to divide the bars into groups with a separate common electrode behind each group of bars and connecting together corresponding bars in each of the groups.

DETAILED DESCRIPTION OF THE INVENTION

Figure 1:
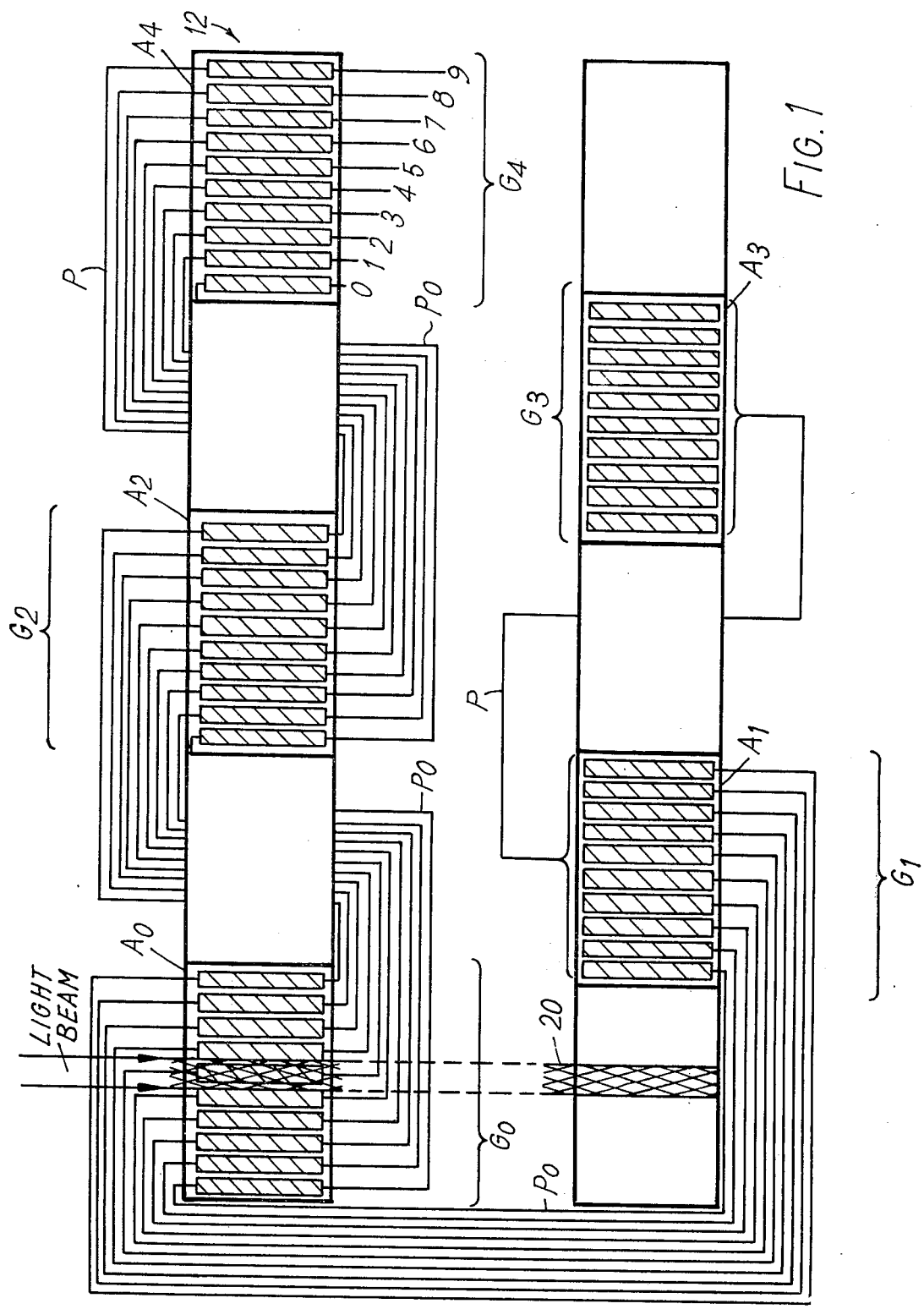
FIG. 1 is a schematic view of part of one embodiment of a liquid crystal device suitable for use in the invention.

FIG. 1 shows a schematic view of part of a preferred embodiment of a liquid-crystal device. Referring to FIG. 1, a liquid-crystal device 12 comprises ten groups of ten equi-spaced, parallel bar electrodes designated 0 to 9, of which only five groups $G_0$ to $G_4$ are shown. Each group G of bars is provided with a corresponding common, backing electrode A of which only five, $A_0$ to $A_4$ are shown. Such a device 12 comprising ten groups each of ten bars would give a resolution of 1% assuming a light beam width equal to or less than the width of a bar electrode. If a greater resolution, such as 0.1% is required then a device comprising 32 groups each of 32 bars could be used which would give a resolution of 1 part in 1024.

Corresponding bars in each group G are interconnected by means of a pattern P of conductors as shown. Thus each of the bars 0 are interconnected by connection $P_0$. The pattern P of conductors may be formed on the device by a printed-wiring process. To facilitate the design of the interconnection pattern P, the groups G of bars have been divided into two rows as shown. Each group in a row is spaced from an adjacent group by an amount equal to the length of the group, and the groups in one row are staggered in relation to the groups in the other row. To energise the liquid-crystal cells constituted by a bar its common backing electrode A in a sequence starting from bar 0 of group $G_0$ it is necessary to apply an electric field between electrode $A_0$ and each of the bar electrodes 0 to 9 of group $G_0$ in sequence, then between electrode $A_1$ and each of the bar electrodes 0 to 9 of group $G_1$ in sequence and so on. As corresponding bar electrodes are coupled together it will be seen that only ten drive connections are required for the bar electrodes and ten for the common electrodes A, giving a total of twenty connections as compared with a total of 101 connections which would be required for a simple device in which 100 bars are arranged in a single row.

Figure 2:
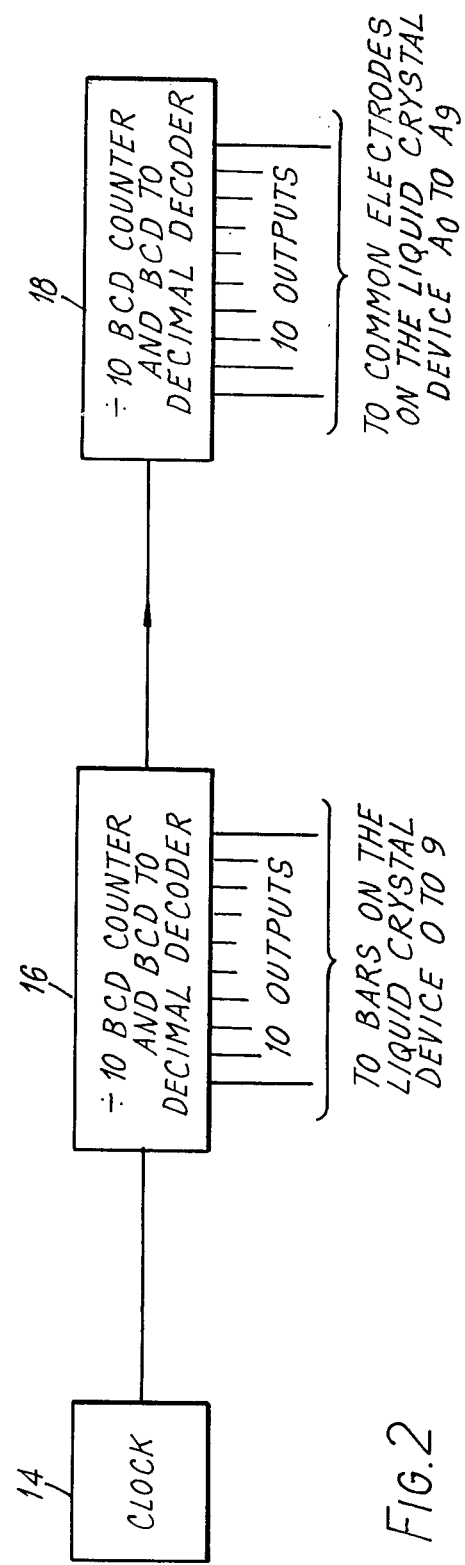
FIG. 2 shows a simplified block circuit diagram of one embodiment of apparatus for energising the liquid crystal device of FIG. 1.

FIG. 2 shows a simplified block circuit diagram of apparatus for energising the bar electrodes sequentially, so that as each bar is energised the light-transmission characteristic of its associated liquid-crystal cell is changed from transparent to opaque.

The apparatus comprises a clock pulse generator 14 having its output connected to the input of a counter 16. The counter 16 comprises a divide by ten Binary Coded Decimal (BCD) counter having its outputs coupled to a BCD to decimal decoder having ten outputs, representative of counts 0 to 9, which are coupled to the bars 0 to 9 respectively. Thus for each sequence of 10 clock pulses a potential is applied sequentially to the bars 0 to 9 in each of the groups G of the device 12.

The carry output of the counter 16 is connected to the input of a further counter 18 such that one input pulse is coupled to the counter 18 for every 10 clock pulses coupled to counter 16. The counter 18 is similar to counter 16 and comprises a divide by ten BCD counter coupled to a BCD to decimal decoder. The ten outputs of this decoder are coupled to the ten common electrodes $A_0$ to $A_9$ respectively.

Thus in operation, if both counters 16 and 18 are set to zero, common electrode $A_0$ and the bars 0 are energised so that the resulting electric field across the first cell defined by $A_0$ and bar 0 of group $G_0$ causes the cell to change from transparent to opaque. As clock pulses are applied the counter 16 causes the cells of bars 1 to 9 in group $G_0$ to change from transparent to opaque and return to the transparent state in sequence and the tenth clock pulses causes counter 18 to step one bit so that common electrode $A_1$ is actuated and the cells of group $G_1$ are then energised sequentially and so on until all 100 bars have been energised in sequence. Thus it would appear as if a shutter were being drawn across each of the liquid-crystal cells in sequence.

If a light beam 20 of width approximately equal to the width of a bar electrode and of sufficient length to span both rows of bar electrodes is directed at the liquid-crystal device 12 from one side, and if both the bar electrodes and the common electrodes are transparent, the beam would pass through the device and could be detected by a photo-electric device on the other side of the device 12. When the liquid-crystal cell through which the beam passes is energised it changes from transparent to opaque so that the beam is interrupted and the resultant change in light level at the photo-electric device can be detected and used to determine which cell is energised and therefore the position of the beam, or the resultant spot of light, on the liquid-crystal device 12. One simple method would be to count the clock pulses generated from the start of a sequence at the first bar, which may be regarded as a datum position, until the light beam is interrupted. The number of clock pulses counted will provide a direct indication of the energised cell and thus the position of the light spot in relation to the datum position. The count in the counter could be decoded and used, for example, to actuate a digital indicator to provide a visual indication, or to provide a control signal, depending upon the application of the apparatus.

Figure 3:
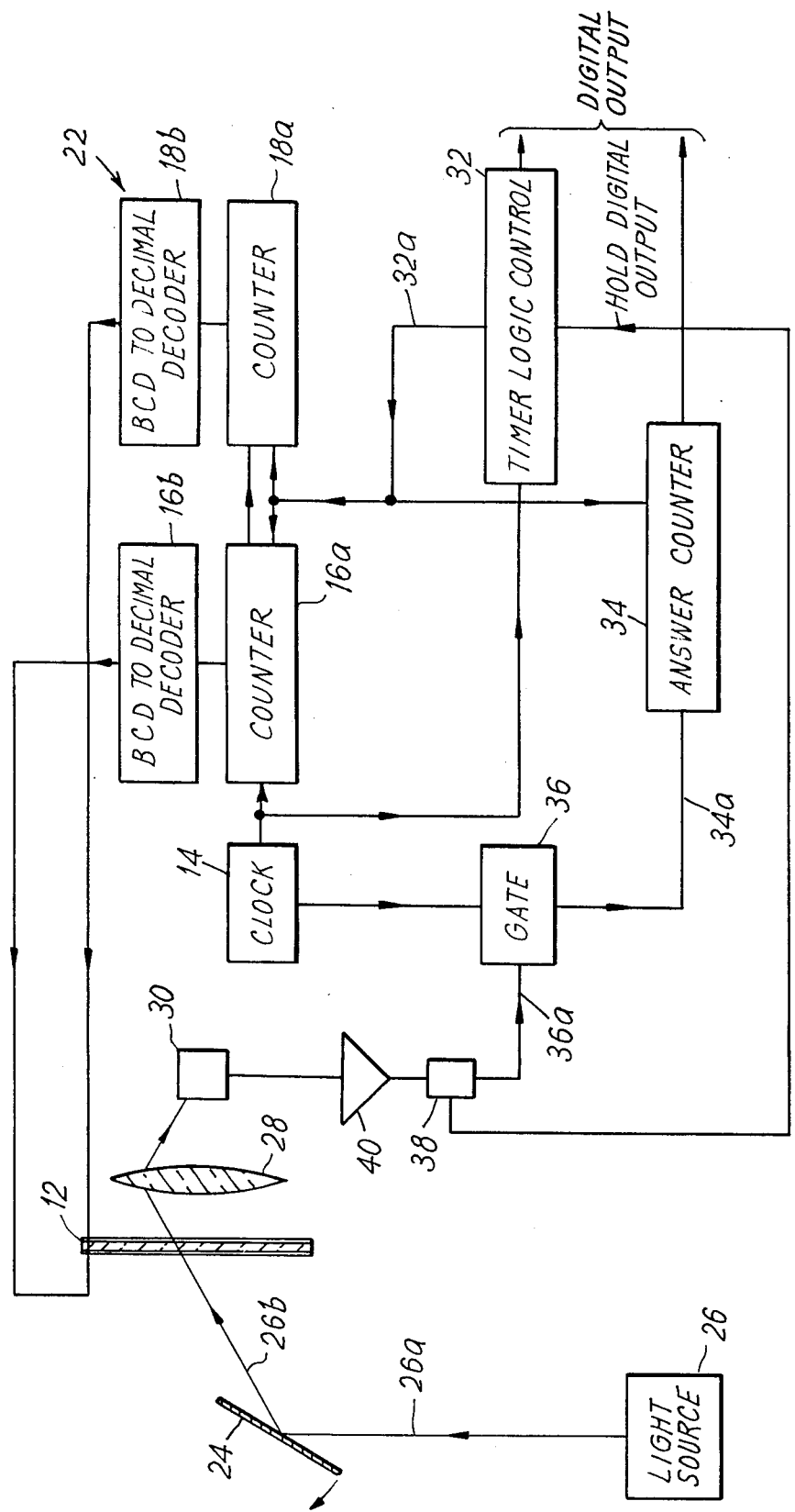
FIG. 3 shows a simplified block circuit diagram of an embodiment of apparatus according to the invention for determining where a beam of light strikes the plane surface of a liquid crystal device such as that of FIG. 1.

FIG. 3 shows a simplified block diagram of an embodiment of apparatus according to the invention for determining the position a beam of light strikes the plane surface of the liquid-crystal device 12 of FIG. 1. The apparatus 22 is designed to provide a digital indication of the angular deflection of a mirror 24 from a datum position. The mirror 24 is so orientated in relation to a liquid-crystal device 12 that when it is in its datum position a narrow beam of light 26a received from a light source 26 is reflected on the first bar in the first group $G_0$ of the device 12. In operation, the mirror 24 can be deflected through an angle $\theta$, which causes the reflected beam 26b to move along the device 12 and it is this angle $\theta$ which is of interest. After passing through the device 12 the beam 26b is picked-up by a lens system 28 and focussed on a photo-electric cell 30. The output of the photo-electric cell 30 is amplified in an amplifier 40 and applied to the input of a monostable circuit 38.

The cells of the liquid-crystal device 12 can be energised sequentially by means of counters 16 and 18 as described in relation to FIG. 2 but in this case the clock pulse generator 14 is coupled to the counters 16,18 by way of a timer logic control circuit 32 for a purpose to be described hereinafter.

The logic control circuit 32 controls the operation of the apparatus and has an output 32a coupled to the counters 16,18 and to an answer counter 34 to set each of these counters to zero at the commencement of operation. The answer counter 34 has an input 34a coupled to receive clock pulses by way of a gate 36 having a control input 36a connected to the output of the monostable circuit 38.

In operation, the timer logic control circuit 32 at discrete time intervals presents a zero command pulse to the two counters 16a and 18a and to the answer counter 34. On release of this zero command pulse, clock pulses from the clock 14 will be routed to the counter 16a and, provided there is a signal from the light cell 30, the gate 36 will be open and clock pulses will be fed to the answer counter 34. The two counters 16a, 18a will sequence their outputs to the liquid-crystal device 12 by way of the BCD to decimal decoders 16b and 18b and as explained in relation to FIG. 2 the bars will be energised in sequence along the liquid-crystal device 12. As soon as the bar of the device receiving the light beam is energised the beam will be interrupted and the change in light level will be detected by the light cell 30 which will in turn provide an output signal to operate the monostable circuit 38 by way of amplifier 40 and close the gate 36. Closure of the gate 36 will stop any more pulses entering the answer counter 34, and the accumulated pulse count in the answer counter will be directly proportional to the position of the light beam along the face of the liquid-crystal device 12. The answer will be available for the duration of the pulse output from the monostable circuit 38. The digital output from the answer counter 34 can then be used as required, for example, it could be decoded and used to control a digital display device.

By this means it can be seen that by making only 20 connections to the liquid crystal detector a resolution of 1 part in 100 can be achieved. Similarly if a matrix of 32 × 32 (32 Groups G each containing 32 bar electrodes) is used then by making 64 connections to the liquid crystal detector a resolution of 1 part in 1024 is possible.

In the latter case, of course, various minor changes would be made to the apparatus of FIG. 3. For example the BCD counters 16a, 18a and BCD to Decimal decoders 16b, 18b would be changed to ÷ 32 counters and binary to 1 in 32 decoders respectively.

As the reflected beam 26b is received from a variable angled mirror 24, the length of the beam between the mirror and the device 12 will not be constant and the linear position of the light beam along the face of the detector will not be directly proportional to the angle of the mirror. To improve the linearity of the measurement the device 12 could be made with an appropriately curved surface, but this may prove difficult to manufacture. An alternative approach would be to alter the spacing between the bars along the length of the device in order to compensate for the different light path lengths as the light beam traverses the length of the device.

The technique described in relation to FIG. 3 uses a straightforward direct counting method wherein the bars are energised progressively along the length of the device 12 until the light beam is interrupted. If the light beam is at the extreme end of the device remote from the first, datum bar then 100 clock pulses would have to be counted before the answer was obtained. If for instance the clock pulse rate was 10 KHz then the measurement time would be 10 mS. If a 32 × 32 matrix device 12 was used, 1024 clock pulses would have to be counted and the resulting digitisation time would be 102.4 mS.

Figure 4:
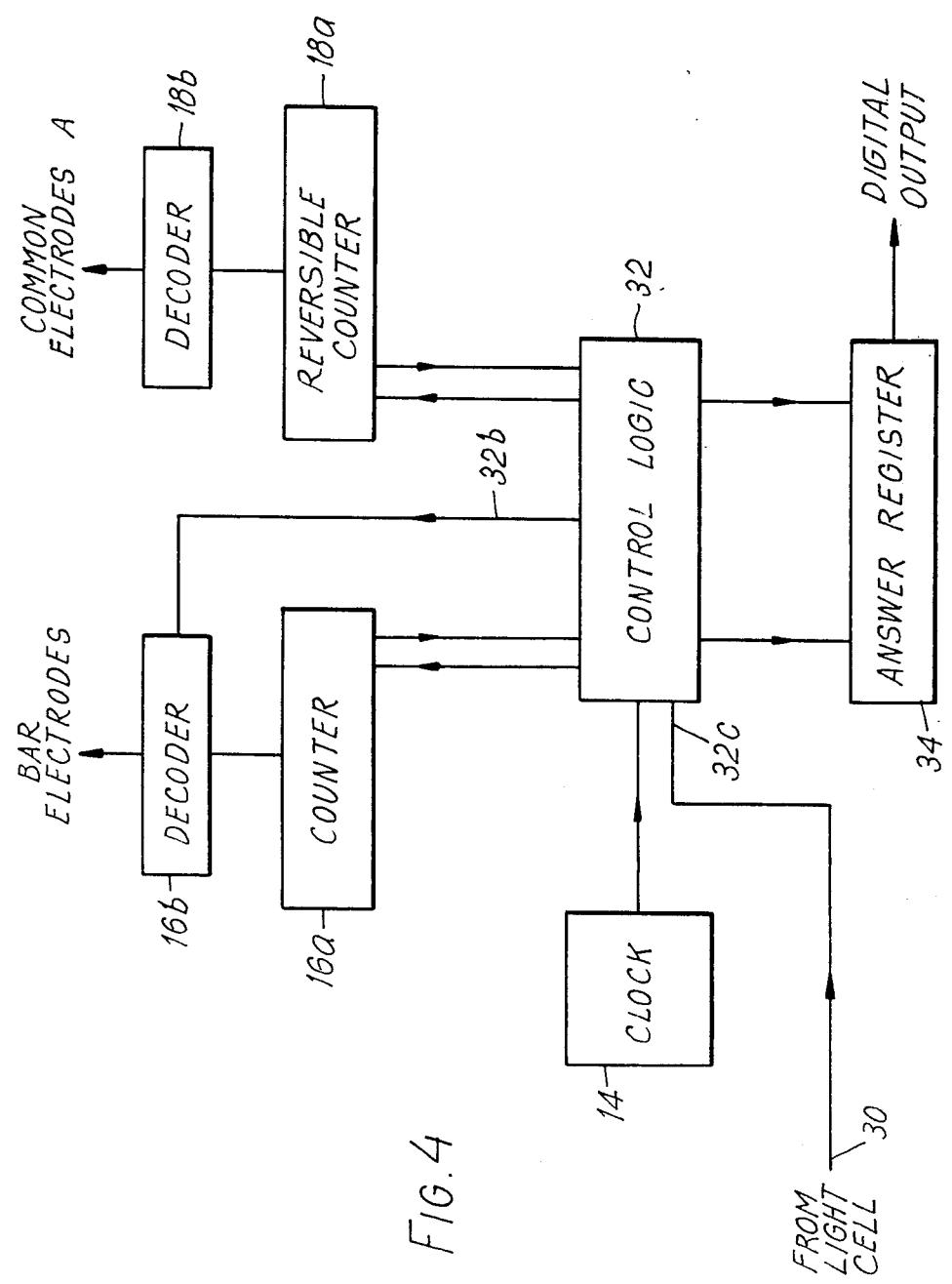
FIG. 4 shows a modification of the circuit of FIG. 3.

FIG. 4 shows a part of the apparatus of FIG. 3 modified to reduce the measurement time. In the modified apparatus the control logic circuit 32 has an output 32b connected to the decoder 16b and is arranged to set the decoder to a condition in which all the bars in each group G are energised. The counter 18a is made a reversible counter and clock pulses from generator 14 are routed directly to its input by way of the logic control circuit 32. Thus the common electrodes A can be energised sequentially from $A_0$ to $A_9$. This will have the effect of interrupting the light path one group G at a time. The pulses are fed to the counter 18b until the light beam 26b is interrupted. As soon as the light beam is interrupted and detected by the cell 30, a signal on line 32c causes the logic control circuit 32 to disconnect the clock pulse generator 14 from the counter 18a and the counter 18a is reversed and clocked back one count. The count information from the counter 18b is then decoded and fed by way of the control logic to the answer register 34 in the form of a number. For instance if the counter had counted 3 clock pulses, it would then be stepped back by one clock pulse, this would then represent a count of 20, which count would be transferred to the answer register 34. Next the energisation is removed from the bars by resetting the decoder 16b to its normal function and resetting counter 16a to zero so that the bars 0 are energised. Clock pulses are now applied to the input of counter 16a and each bar is energised in turn as described in relation to FIG. 3. In addition, the answer register 34 is now connected to operate normally as a counter and the clock pulses are also routed to it. The bars are then energised in sequence with a carry pulse being applied to the counter 18a if a count of 10 is reached in counter 16a. When the light beam 26b is again interrupted the flow of clock pulses to the answer register 34 is stopped and the accumulated count in the register 34 will be proportional to the position of the light spot along the face of the liquid-crystal device 12. However this has now been achieved using a maximum of 31 clock pulses. Taking the example again using a clock frequency of 10k Hz then the total digitisation time would be 3.1 mS. This could have an advantage where digital averaging over a fairly large number of readings is required in order to reduce the effects of light-spot wobble due to shock or vibration. Obviously the larger the number of samples that can be taken in a given time the better will be the digital averaging, provided of course that the digitisation rate is not synchronous with the disturbing frequency.

Figure 5:
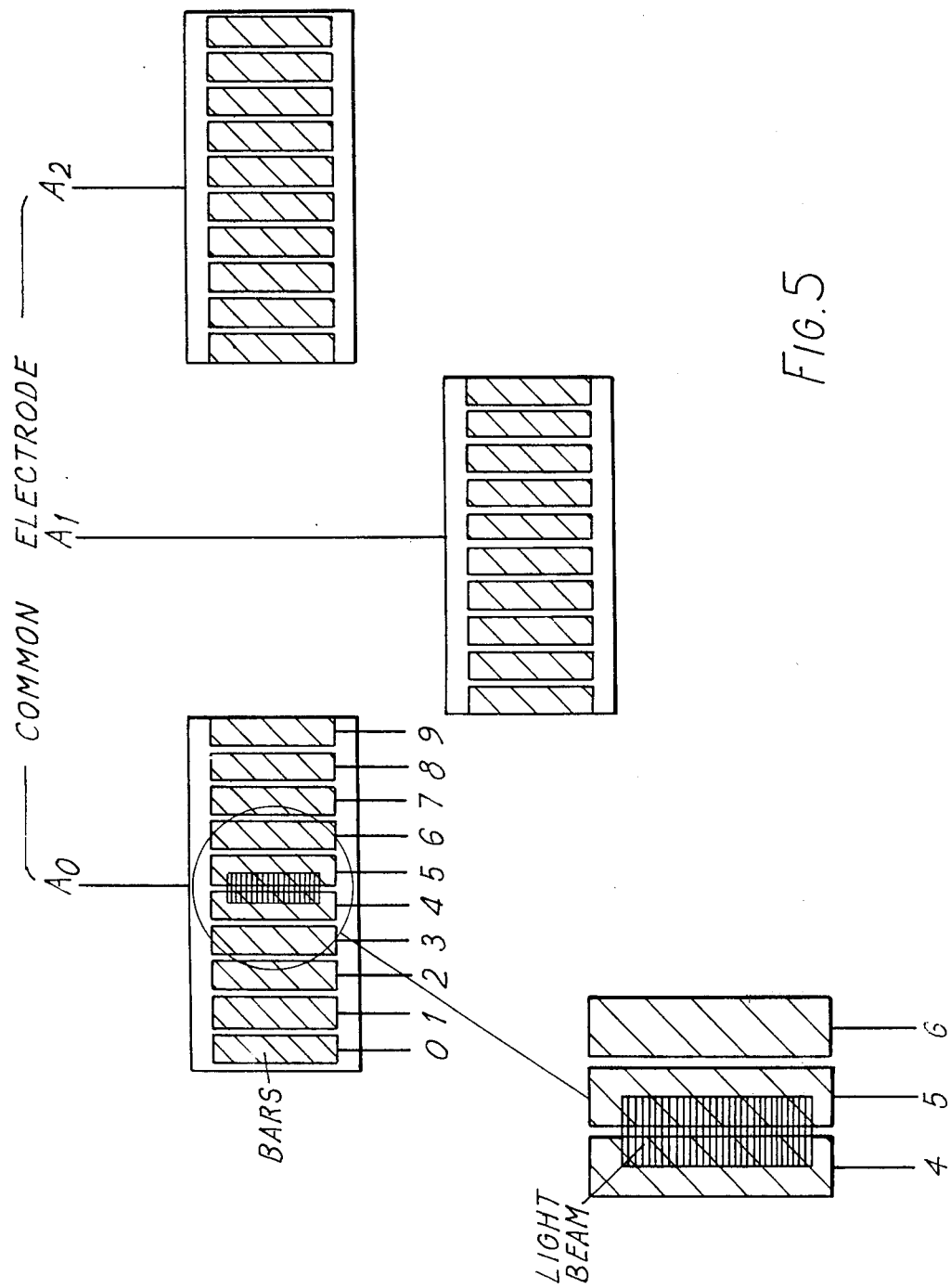
FIG. 5 shows part of a liquid-crystal device which shows how a light beam can span part of two adjacent bar electrodes of the liquid-crystal device of FIG. 1.

After determining which bar is illuminated by the light spot, further information can be gathered by measuring the magnitude of the voltage output signal from the light cell 30. This will be directly proportional to the position of the light spot on the next succeeding adjacent bar provided the width of the light spot is equal to the width of the bar. FIG. 5 shows part of a liquid-crystal device wherein the bars are a certain width and are separated from each other by a small gap. The light spot is made in the form of a bar the same width as the bars on the liquid-crystal device. The bars and the common electrodes A are interconnected in the same pattern as shown in FIG. 1. Now as before as soon as the light detector 30 registers a change in output the counters are commanded to stop, in the example in FIG. 5 bar No. 4 would be energised. As bar 4 is now opaque the amount of light reaching the light detector 30 will be determined by the position of the light bar on bar No. 5, the further the light bar is to the right, the higher will be the output from the light cell 30.

If the output from the light cell 30 is now suitably amplified, scaled, and then measured, the information can be included with the information from the counters to improve the overall resolution. As the information from the counters is in digital form the measuring device would suitably be an analogue to digital converter (ADC) so that the digital information from the ADC could simply be added to that from the counter 34. One embodiment of an apparatus according to the invention for implementing this is shown in FIG. 6 which is a modification of the apparatus described in relation to FIGS. 3 and 4.

Figure 6:
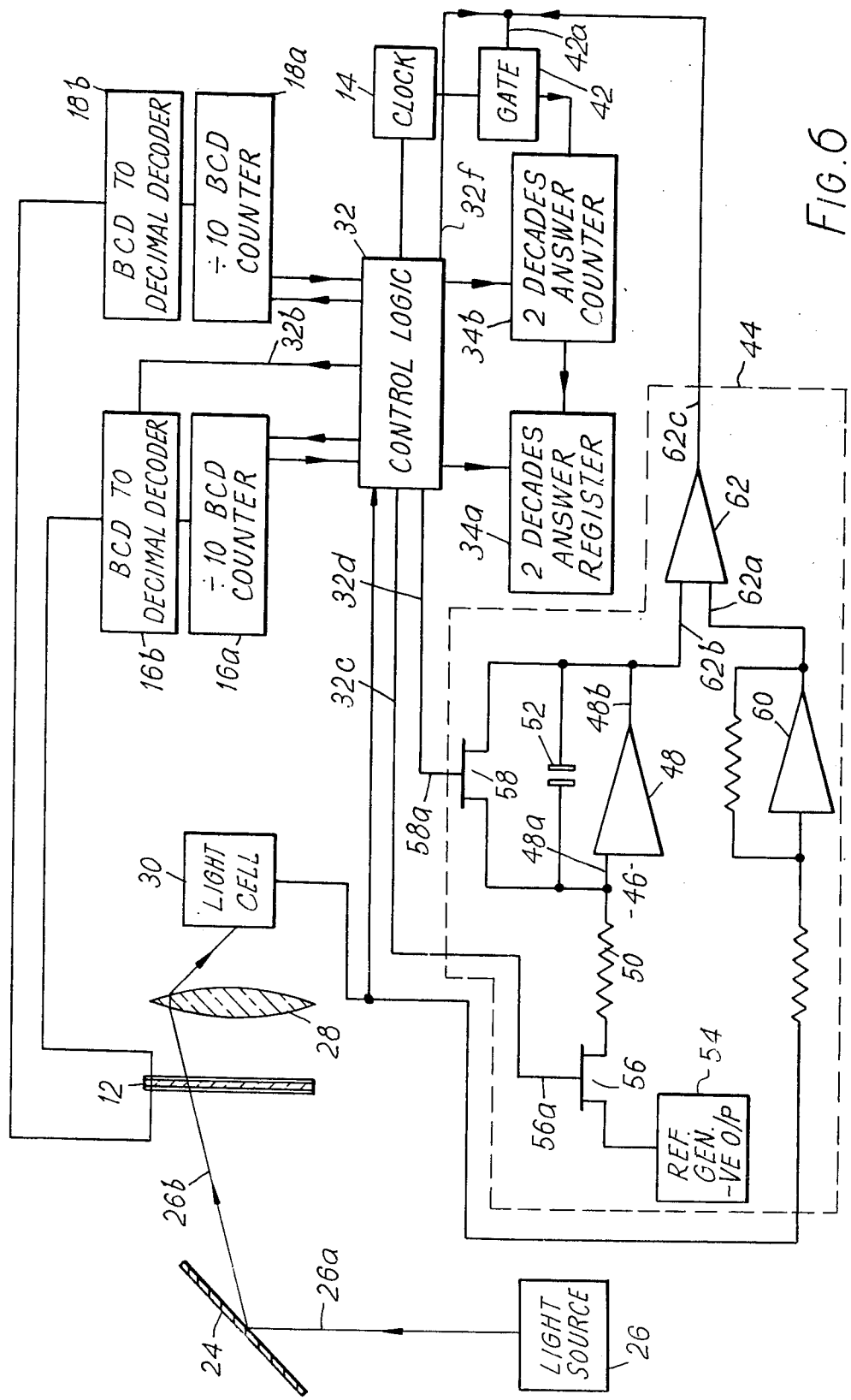
FIG. 6 shows a block circuit diagram of another embodiment of apparatus according to the invention.

Referring to FIG. 6, the answer counter 34 is divided into two portions 34a and 34b, each two decades long. Counter portion 34a is arranged to count clock pulses received from clock pulse generator 14 by way of the logic circuit 32 as before. Counter portion 34b is arranged to count clock pulses by way of a gate 42 having a control input 42a coupled to the output of an analogue voltage to time duration converter (ATC), shown within a broken line 44. Gate 42 is normally held closed by a signal on a line 32f from logic circuit 32 applied to its control input 42a. In combination, the ATC 44, gate 42 and clock 14 form an analogue to digital converter ADC.

The ATC 44 is a ramp-type converter including an integrator 46 comprising an operational amplifier 48 having an input resistor 50 and a feedback capacitor 52 connected between its output 48b and input 48a. A source 54 of a negative reference voltage is coupled to the input of the amplifier 48 by way of a series circuit consisting of a FET switch 56 and the resistor 50. A further FET switch 58 is connected across the capacitor 52 and the control electrodes 56a and 58a of the two FET's are coupled to two control outputs 32c and 32d respectively of the logic circuit 32.

The output from the light cell 30 is coupled to the input of an amplifier 60 whose output is coupled to one input 62a of a comparator 62. The other input 62b of the comparator is coupled to the output 48b of the integrator and the output 62c of the comparator, which is the output of the ATC, is coupled to the control input 42a of the gate 42.

In operation of the apparatus, the ATC 44 is initially rendered inoperative by signals on lines 32c and 32d from logic circuit 32 which render switch 56 open to disconnect the source 54 from the integrator 46 and switch 58 closed to short the capacitor 52. The control logic circuit 32 controls the counters 16 and 18, and routes clock pulses to counter 34a as described in relation to FIGS. 3 and 4 until the photoelectric cell 30 detects a change in the light-level of the beam 26b received through the liquid-crystal device 12 to stop the flow of pulses to counters 16, 18 and 34a. The count in counter 34a is thus representative of the position where the light beam 26b strikes the device 12.

As previously described the magnitude of the output signal from the light cell 30 is also dependent upon the position of the beam. Switch 56 is now closed and switch 58 opened by the logic circuit 32 and the ADC is rendered operative. The inhibit signal to gate 42 on line 32f is also removed to open the gate. As soon as the switches 56 and 58 are operated the negative reference voltage is applied to the integrator 46 and a positive-going ramp voltage appears at its output and is thus applied to input 62b of the comparator 62. The output voltage signal from light cell 30 is amplified and scaled in amplifier 60 and applied to the other input 62a of the comparator 62.

While the integrator output voltage is more negative than the output of amplifier 60, the output from the voltage comparator 62 will keep open the gate 42 and allow clock pulses to pass to answer counter 34b. As soon as the integrator output voltage becomes more positive than that of amplifier 60, the output from the comparator 62 will close the gate 42 and prevent further clock pulses from entering counter 34b.

Now as the output from the light cell 30 will get larger as the light beam 26b moves from the energized liquid-crystal cell to the next succeeding cell, it will be seen that the count in the answer counter 34b will also get proportionately larger. The accuracy will depend on the linearity of the output signal from the light cell 30 against light intensity input and the linearity of the ramp generator 46. Thus the apparatus now provides a system for measuring the position of the light beam on the face of the liquid-crystal display with a resolution of 1 part in 10,000. The accuracy will also be dependent on the positional accuracy of the bars, if they are positioned to an accuracy of 0.01% and the overall accuracy of the light cell plus the ADC is within 1% then the overall accuracy will be within about 0.02%. Of course a number of different types of analogue to digital converters can be used, but it is preferable that a reasonably fast conversion is made, so that if the light beam is vibrating, an instantaneous measurement of its position is made. For this reason it may be preferable to use a successive approximations type analogue to digital converter, instead of the ramp type described.

Figure 7:
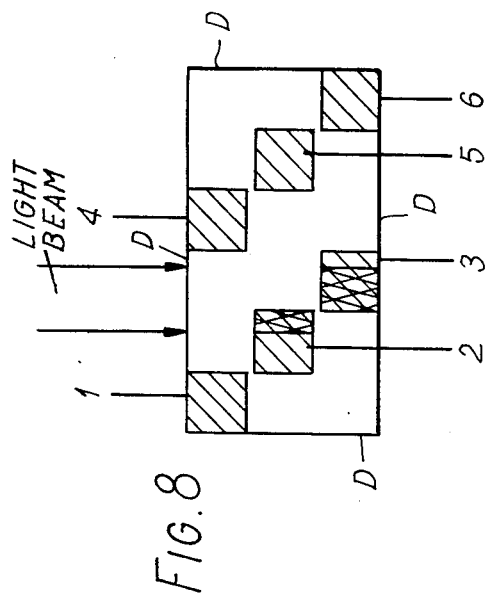
FIGS. 7 and 8 show part of two further liquid-crystal devices.

The overall accuracy of apparatus as described is also dependent upon the width of the gap between the bars. For instance if an overall accuracy of 0.01% was required which would match the resolution of the system described, then the bar width on a liquid-crystal device of length approximately one inch would be 0.01 inch but the gaps would have to be held to a width of 0.0001 inch. This may present some practical problems. One alternative approach is to use a pattern as shown in FIG. 7 for the segmental electrodes in a group. The bars would be energised in the sequence 0, 1, 2, 3 and 4 and so on, as described above, and in the example shown in FIG. 7 bar 2 would be energised. Therefore as before the light output onto the light cell 30 would increase linearly as the beam moves from left to right in the figure, the cell 30 receiving its light by way of bar 3. With this method however there is no gap between the bars and the accuracy of the final answer will be dependent on the accuracy of the position and width of the bars. It should be pointed out that the areas D between the bars are blacked out areas of the liquid-crystal device 12.

Figure 8:
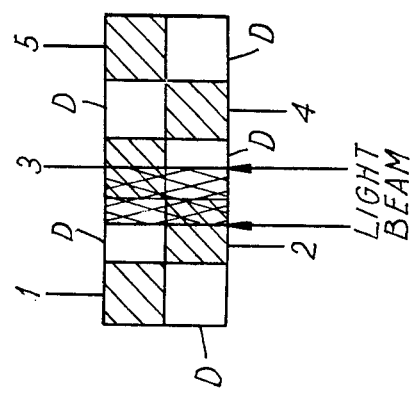

Another advantage of this arrangement is that the effects of fringing of the liquid-crystal device are eliminated provided that the fringing effects are not greater than the width of one bar electrode. If in fact the fringing effect is greater than one bar's width then several rows can be made, and an example showing three rows is illustrated in FIG. 8 — here the rows are also spaced to reduce the fringing effects across the corners.

If this results in a requirement for a light beam having a cross-section which is very long in relation to its width with perhaps a difficult alignment problem then two or more separate light beams could be used, one for each row.

Figure 9:
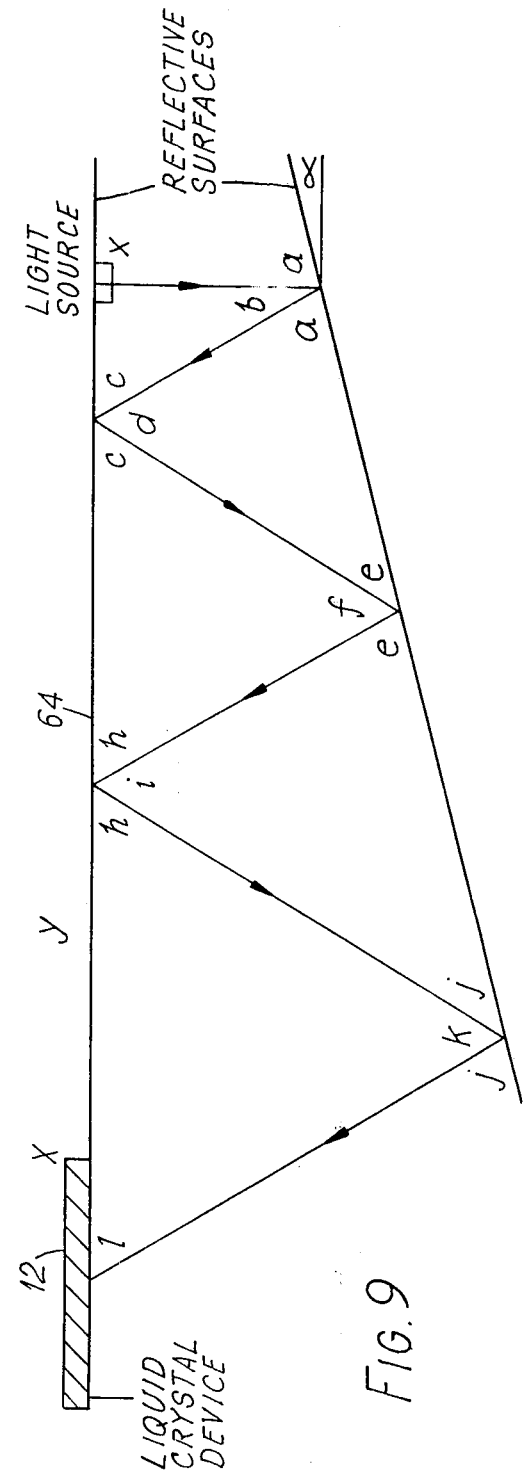
FIG. 9 shows a system for amplifying the magnitude of the deflection of a light beam for use with apparatus according to the invention.

To achieve an amplified movement of a light beam across the liquid crystal device for a given change in angle of the reflecting surface 24, the light beam can be reflected between two surfaces as shown in FIG. 9.

The light source is at $x$ and the light is reflected back and forth between two reflecting surfaces 64, 66. From the example shown below it can be seen that the effective angle $\alpha$ is increased by a factor of 10 by reflecting the beam back and forth 5 times. Hence there is an effective mechanical advantage of 5 over one simple reflection system.

Apparatus according to the invention may be used in a variety of applications. For example:

1. The movement of a bellows or diaphragm of a pressure transducer could be converted to the angular movement of the reflecting surface, by example, by coupling the bellows or diaphragm to the mirror 24 by means of a rigid force-transmitting member, so that the analogue output of the pressure transducer is converted to digital form. As aforementioned the spacing of the bar electrodes may have to be corrected to allow for the nonlinearity of the system. The multiple reflection system described in relation to FIG. 9 may also be able to be used in this application.

2. In a linear displacement transducer the light source could be coupled directly to the displacement head and arranged to travel over the surface of the liquid-crystal device. It is estimated that by this approach displacement can be measured over a distance ranging from 1 inch to 6 inches with a resolution of one part in $10^4$ with an overall accuracy of say 0.05%.

3. Measurement of angle can be measured by making the liquid-crystal device in the form of a disc with the bar electrode pattern deposited around the periphery of the disc. The light source would then be made to travel around the periphery of the disc, so that the angle from a given datum can be measured. The estimated accuracy would be as with the linear displacement transducer.

While apparatus according to the invention embodying liquid-crystal devices has been described, it is believed that other electrooptic shutter devices, such as electrooptic ceramics, for example lead lanthanum zirconate titanate (PLZT) ceramic wafers, could be used.

I claim:

1. Apparatus for determining the position on a substantially plane surface where a beam of light strikes the surface in relation to a datum position, comprising an electrooptic device having a common electrode on one surface and a plurality of spaced, segmental, electrodes in a predetermined pattern on the other surface to define a corresponding plurality of electrooptic cells of which at least one of the common electrode and the plurality of segmental electrodes is transparent, means for changing the light-transmission characteristics of the electrooptic cells in a predetermined sequence from a datum position, means for directing a beam of light towards the electrooptic device and detector means positioned in relation to the device and the light-directing means for detecting a change in the light-level of the beam transmitted through the electrooptic device when the light-transmitting characteristic of a cell receiving the beam is changed to provide a detector output signal and means responsive to the detector output signal for providing an indication of the cell receiving the beam, thereby to provide an indication of the position on the surface of the electrooptic device struck by the beam.

2. Apparatus according to claim 1, in which both the common electrode and the plurality of segmental electrodes are transparent, the light-directing means is positioned on one side of the electrooptic device and the detector means on the other.

3. Apparatus according to claim 1, in which only one of the common electrode or plurality of segmental electrodes is transparent, the source and the detector means are positioned on the side of the electrooptic device having the transparent electrode or plurality of electrodes and the electrode, or plurality of electrodes, on the other surface of the device is made reflective.

4. Apparatus according to claim 1, in which the means for changing the light-transmission characteristics of the cells comprises means for energising the segmental electrodes in a predetermined sequence.

5. Apparatus according to claim 4, in which the means for energising the segmental electrodes comprises a shift register, or a counter and decoder arranged to operate in a similar manner to a shift register, having its output connected to the said electrode.

6. Apparatus according to claim 2, in which the means for changing the light-transmission characteristics of the cells comprises means for energising the segmental electrodes in a predetermined sequence.

7. Apparatus according to claim 6, in which the means for energising the segmental electrodes comprises a shift register, or a counter and decoder arranged to operate in a similar manner to a shift register, having its output connected to the said electrode.

8. Apparatus according to claim 1, in which the plurality of segmental electrodes are in the form of a grid of parallel bars of substantially equal width.

9. Apparatus according to claim 1, in which the width of the bars is varied to compensate for differing beam lightpath lengths as the beam traverses the length of the device.

10. Apparatus according to claim 1, in which the spacing between the bars is substantially constant along the length of the device.

11. Apparatus according to claim 1, in which the spacing between the bars is varied to compensate for different beam light-path lengths as the beam traverses the length of the device depending upon the form of the means for directing the beam of light.

12. Apparatus according to claim 1, arranged to determine the angular deflection of the means for directing the beam of light.

13. Apparatus according to claim 1, arranged to determine the linear deflection of the means for directing a beam of light.

14. Apparatus according to claim 1, in which the plurality of segmental electrodes comprise a plurality of bars extending radially outwardly from a common axis.

15. Apparatus according to claim 1, in which the plurality of segmental electrodes comprise a plurality of spaced segments arranged in the form of an annulus.

16. Apparatus according to claim 1, in which the plurality of segmental electrodes are arranged in n groups each of $m$ segments having $n$ corresponding common electrodes.

17. Apparatus according to claim 16, in which the $n$ groups of segments of the electrooptic device are arranged as $n/y$ groups of segments in each of $y$ parallel rows.

18. Apparatus according to claim 17, in which each group of $m$ segments in a row is spaced from an adjacent group in the row by an amount equal to the length of said group multiplied by $(y - 1)$ and the groups in one row are staggered in relation to the groups in an adjacent row whereby the cells in a group in one row are energised sequentially, then the cells in the next succeeding group in an adjacent row and so on.

19. Apparatus according to claim 16, in which corresponding segmental electrodes in each group are coupled together and the means for energising the electrodes comprises a source of a potential difference and means for coupling the source to the segmental electrodes and the common electrodes in such a manner that one side of the source is coupled sequentially to each of the first to $m$th segmental electrodes in common at a first rate and the other side of the source is coupled sequentially to each of the common electrodes starting with the first, at a second, slower rate such that the said other side of the source is switched from one common electrode to the next as the said one side is switched from the $m$th to the first segmental electrode.

20. Apparatus according to claim 19, in which the means for energising the electrodes further comprises means for first coupling the said one side of the source to all of the segmental electrodes simultaneously, means for coupling the said other side of the source to the common electrodes in a predetermined sequence until a first change in light-level is detected, means responsive to the first detected output signal for stepping-back one step in the predetermined sequence of common electrodes, and secondly for causing the means for energising the segmental electrodes to operate according to claim 19.

21. Apparatus according to claim 17, in which corresponding segmental electrodes in each group are coupled together and the means for energising the electrodes comprises a source of a potential difference and means for coupling the source to the segmental electrodes and the common electrodes in such a manner that one side of the source is coupled sequentially to each of the first to $m$th segmental electrodes in common at a first rate and the other side of the source is coupled sequentially to each of the common electrodes starting with the first, at a second, slower rate such that the said other side of the source is switched from one common electrode to the next as the said one side is switched from the $m$th to the first segmental electrode.

22. Apparatus according to claim 21, in which the means for energising the electrodes further comprises means for first coupling the said one side of the source to all of the segmental electrodes simultaneously, means for coupling the said other side of the source to the common electrodes in a predetermined sequence until a first change in light-level is detected, means responsive to the first detected output signal for stepping-back one step in the predetermined sequence of common electrodes, and secondly for causing the means for energising the segmental electrodes to operate according to claim 21.

23. Apparatus according to claim 18, in which corresponding segmental electrodes in each group are coupled together and the means for energising the electrodes comprises a source of a potential difference and means for coupling the source to the segmental electrodes and the common electrodes in such a manner that one side of the source is coupled sequentially to each of the first to $m$th segmental electrodes in common at a first rate and the other side of the source is coupled sequentially to each of the common electrodes starting with the first, at a second, slower rate such that the said other side of the source is switched from one common electrode to the next as the said one side is switched from the $m$th to the first segmental electrode.

24. Apparatus according to claim 23, in which the means for energising the electrodes further comprises means for first coupling the said one side of the source to all of the segmental electrodes simultaneously, means for coupling the said other side of the source to the common electrodes in a predetermined sequence until a first change in light-level is detected, means responsive to the first detected output signal for stepping-back one step in the predetermined sequence of common electrodes, and secondly for causing the means for energising the segmental electrodes to operate according to claim 23.

25. Apparatus according to claim 17, in which the length of the beam in cross-section is sufficient to span all of the rows.

26. Apparatus according to claim 17, in which a separate beam is provided for each row and the beams are so arranged that they move along the rows together.

27. Apparatus according to claim 1, in which the indicator means for providing an indication of the cell receiving the beam comprises a counter arranged to count the number of cells energised from a datum cell until the detector output signal is received.

28. Apparatus according to claim 27, in which the indicator means comprises a decoder coupled to the counter for decoding the count therein, and digital indicating means coupled to the decoder for providing a visual indication of the count.

29. Apparatus according to claim 19, in which the indicator means comprises a decoder coupled to the counter for decoding the count therein, and digital indicating means coupled to the decoder for providing a visual indication of the count.

30. Apparatus according to claim 20, in which the indicator means comprises a decoder coupled to the counter for decoding the count therein, and digital indicating means coupled to the decoder for providing a visual indication of the count.

31. Apparatus according to claim 27, in which the indicator means includes measuring means for measuring the magnitude of the detector output signal and means for using the measured value with the count in the counter to increase the resolution of the said indication.

32. Apparatus according to claim 31, in which said measuring means includes an analog-to-digital converter.

33. Apparatus according to claim 29, in which the indicator means includes measuring means for measuring the magnitude of the detector output signal and means for using the measured value with the count in the counter to increase the resolution of the said indication.

34. Apparatus according to claim 30, in which the indicator means includes measuring means for measuring the magnitude of the detector output signal and means for using the measured value with the count in the counter to increase the resolution of the said indication.

35. Apparatus according to claim 32, in which the output of the analogue to digital converter in the form of a digital number is suitably scaled and added to the count in the counter.

36. Apparatus according to claim 1, in which said means for directing a beam of light comprises a source of a beam of light and a reflective surface for reflecting said beam towards said electrooptic device.

37. A measurement transducer comprising a moveable member and means for causing said moveable member to move in dependence upon the magnitude of a parameter to be measured by the transducer, in combination with apparatus according to claim 1 in which said means for directing the beam of light is coupled to said moveable member whereby said detector output signal is representative of the magnitude of the movement of said moveable member.

38. A transducer according to claim 37, in which the transducer is a pressure-responsive transducer in which the moveable member is a bellows or diaphragm.

39. Apparatus according to claim 1, in which the electrooptic device is a liquid crystal device.

* * * * *